Figure 1:
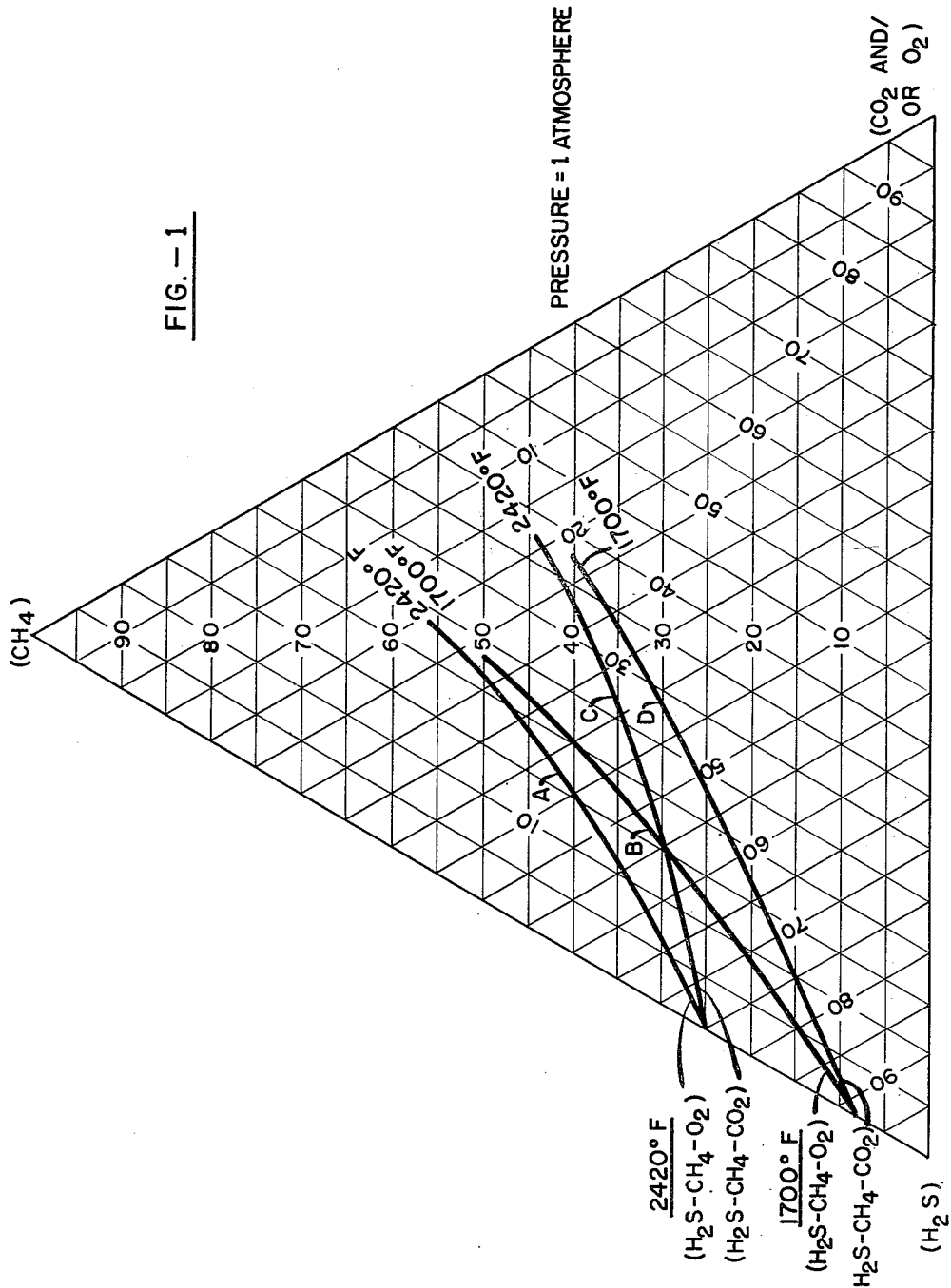

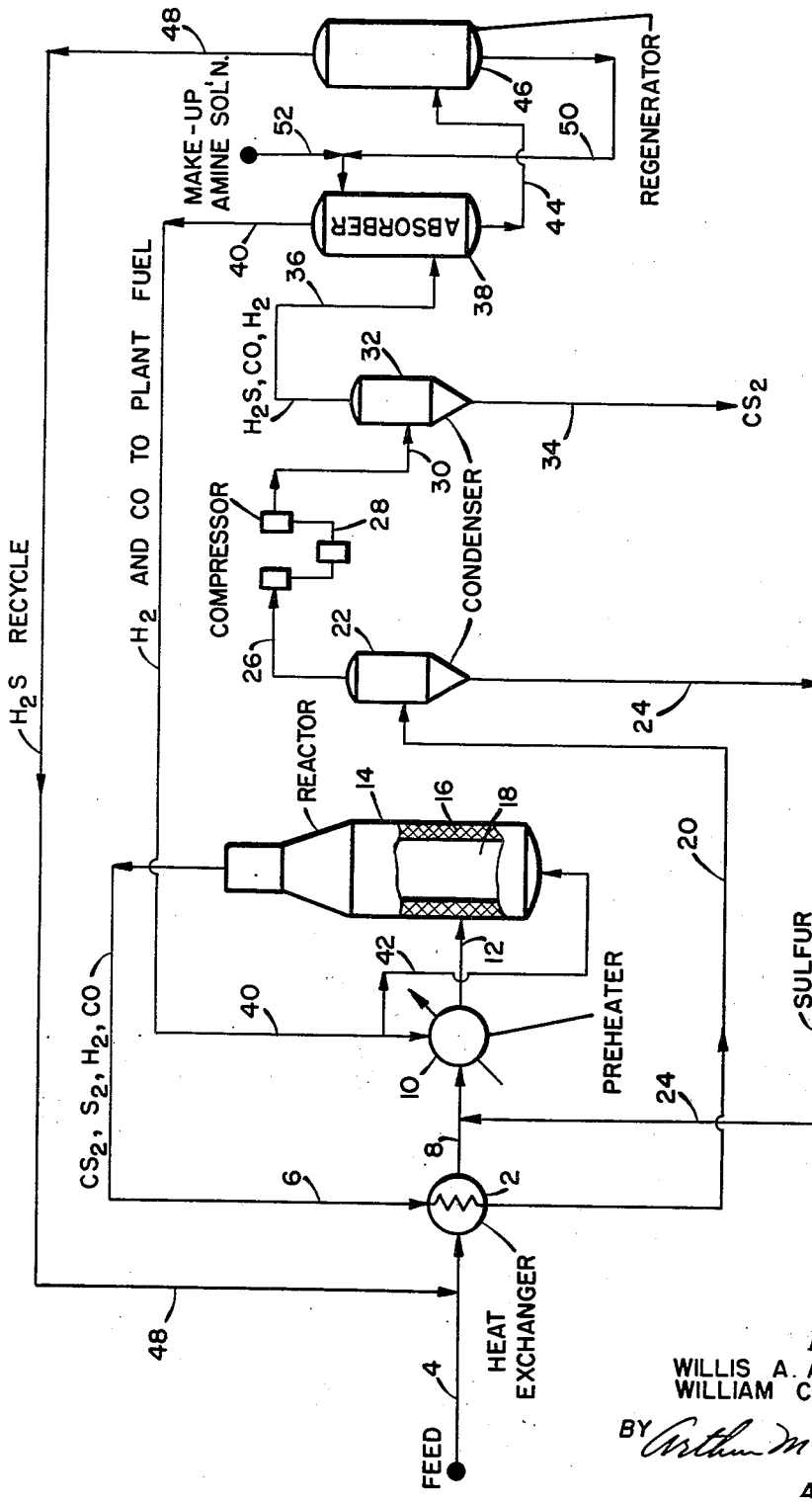
FIG. — 3
INVENTORS
WILLIS A. ADCOCK
WILLIAM C. LAKE
BY Arthur Mc Ilroy
ATTORNEY

United States Patent Office 2,767,058
Patented Oct. 16, 1956

2,767,058

PROCESS FOR THE PRODUCTION OF CARBON DISULFIDE FROM HYDROGEN-SULFIDE CONTAINING GASES

Willis A. Adcock, Dallas, Tex., and William C. Lake, Tulsa, Okla., assignors to Stanolind Oil and Gas Company, Tulsa, Okla., a corporation of Delaware Application May 29, 1953, Serial No. 358,354

9 Claims. (Cl. 23—206)

Our invention relates to a novel method for the production of carbon disulfide. More particularly, it pertains to a new method for the manufacture of carbon disulfide from sour gas streams such as, for example, certain of the sour natural gases.

It is an object of our invention to provide an improved method for the preparation of carbon disulfide from cheap, readily-available starting materials. It is likewise an object of our invention to provide a method for the production of carbon disulfide wherein the raw materials employed as feed require a minimum amount of processing prior to use in the process. It is a still further object of our invention to provide a method for the production of carbon disulfide which can be readily integrated into the operation of natural gasoline plants and the like which process sour natural gas.

While the presence of hydrogen and oxygen in the reaction system involved substantially limits the production of carbon disulfide to an appreciably greater extent than is the case if either or both of these gases are absent, there are instances where process complications and/or availability of suitable raw materials in other than the most desirable forms dictate the use of feed mixtures containing carbon, oxygen, hydrogen and sulfur for carbon disulfide production. Thus, while the use of feeds containing hydrogen sulfide and carbon dioxide to produce carbon disulfide generally results in comparatively poor yields, such practice can be justified in instances where natural gasoline or similar plants produce streams rich in hydrogen sulfide and which contain appreciable quantities of carbon dioxide.

Broadly, the process of our invention comprises the production of carbon disulfide by the utilization of gaseous feed streams containing hydrogen sulfide and carbon dioxide by the use of materials which, under the conditions employed in the process of our invention, yield hydrogen sulfide and carbon dioxide. In carrying out our invention, a gaseous mixture comprising hydrogen sulfide and carbon dioxide in which the sulfur-hydrogen atomic ratio may range from about 0.15 to about 0.45, the oxygen-hydrogen atomic ratio ranges from a value greater than 0 up to about 0.35 and the carbon-hydrogen atomic ratio varies from about 0.1 to 0.35 is first preheated to a temperature of from about 900° to about 1100° F.; thereafter the resulting preheated mixture is introduced into a reaction zone maintained at a temperature of from about 1700° to about 2500° F., preferably from about 2000° to about 2450° F. A catalyst may or may not be present in effecting reaction between the above-mentioned components. The reaction, which is preferably carried out at atmospheric pressure, results in the formation of carbon disulfide, free sulfur, carbon monoxide and hydrogen, and these hot reaction products—together with unconverted hydrogen sulfide and carbon dioxide—are withdrawn from the reaction zone and sent to a suitable heat exchanger where they are brought into indirect heat exchange with a cooler, gaseous feed stream. The resulting cooled product gases are then subjected to further cooling or condensation where the elemental sulfur therein is separated from the other components of the mixture and returned to a suitable preheater, after which the resulting hot sulfur vapors are preferably combined with the gaseous feed. The gaseous effluent is subjected to the combination of increased pressure and additional cooling after the sulfur condensation step, resulting in the removal of product carbon disulfide and leaving a gaseous mixture containing carbon dioxide, hydrogen sulfide, carbon monoxide and hydrogen. The details involved in processing this stream will be described below.

The composition of the gaseous stream used as the feed in operating our invention may consist of one containing initially hydrogen sulfide and carbon dioxide to which methane or an equivalent hydrocarbon is added to bring the carbon-hydrogen and oxygen-hydrogen ratios into proper balance. In the event the hydrogen sulfide and carbon dioxide mixture to be employed initially contains methane in excessive amounts, oxygen—either in free or combined form—may be added in order to maintain the proper concentration of reactants. Thus in some fields the acidic components removed from the natural gas streams are of such a composition that the addition of methane is required in order to secure maximum carbon disulfide production under the conditions of our invention. The North Cowden Field in West Texas is typical of those yielding streams, after the hydrocarbons have been separated therefrom, rich in hydrogen sulfide (85%) and containing an appreciable amount (15%) of carbon dioxide. Because of the relatively high oxygen-hydrogen ratio of such mixtures, i. e., approximately twice that of the carbon-hydrogen ratio, methane should be added in an amount to give a sulfur-hydrogen ratio of about 0.3, an oxygen-hydrogen ratio of about 0.1 and a carbon-hydrogen ratio of about 0.15 if maximum yields of carbon disulfide are to be obtained at temperatures in the neighborhood of about 2400° F. The addition of methane to streams of the type referred to immediately above is essential in order to bring the system into a state of imminent carbon deposition, a condition which we have found must be achieved if maximum yields of carbon disulfide are to be realized. The importance of this feature will be discussed in further detail below.

As the methane content of the feed gas increases with respect to the carbon dioxide present therein, oxygen—either in the form of carbon dioxide or as free oxygen—must be added to the system in order to prevent carbon deposition since the carbon-hydrogen ratio becomes much greater than the existing oxygen-hydrogen ratio. Typical of the sour gas streams in which such circumstances are encountered are those of the Wyoming Silvertip Field. In its natural state this gas has the following approximate composition:

8.0% $CO_2$
29.0% $H_2S$
41.0% $CH_4$
22.0% heavier hydrocarbons

The raw gas as it occurs naturally may be used in our process by supplementing the stream with large quantities of air or carbon dioxide, thus compensating for the high carbon-hydrogen ratio provided by the presence of the heavier hydrocarbons. If the heavier hydrocarbons are separated, however, less air or carbon dioxide is needed to bring the oxygen-hydrogen ratio to a level sufficient to prevent carbon deposition. With a gas of the above-stated composition (having the heavier hydrocarbons removed), air should be supplied in a ratio of about 0.33 volume ($O_2$) per volume of methane (or carbon dioxide in a ratio of 0.66 volume per volume of methane). The presence of nitrogen has a favorable effect on carbon disulfide yields by lowering the partial pressure of the reactants. After separation of the heavier hydrocarbons, ratios of the reactants in the feed mixtures should be approximately as follows:

Sulfur-hydrogen = 0.13
Oxygen-hydrogen = 0.20
Carbon-hydrogen = 0.22

Within the sulfur-hydrogen and oxygen-hydrogen ratios defined in the foregoing description, the carbon-hydrogen in the system is such that carbon deposition—although just on the verge of occurring—can be avoided. It is under such conditions of impending carbon deposition at a given temperature that we have found the highest conversions to carbon disulfide to occur. We have further found that operation of the reaction under conditions of imminent carbon deposition to be extremely important, and any material variation from the atomic ratios recommended above results in a drastic decrease in the formation of carbon disulfide. Thus, if the carbon-hydrogen ratio is reduced to a level below which carbon deposition is no longer impending, carbon disulfide yields drop off sharply. On the other hand, if the carbon-hydrogen ratio is increased to a point where carbon deposition occurs to an appreciable extent, the activity of the catalyst is reduced to a point where further operation is no longer economical.

While it may generally be desirable to carry out the process of our invention in the presence of a catalyst, we do not consider it essential to do so in order to obtain carbon disulfide in accordance with the novel conditions of operation set forth herein.

One of the outstanding features of our invention lies in the fact that it may be employed in conjunction with the operation of natural gasoline plants utilizing sour natural gas streams or, as previously pointed out, certain naturally-occurring sour gases may be used—with a minimum of change in composition—as a feed in the process of our invention to produce carbon disulfide from the aforesaid natural gas streams.

The following table shows results which may be obtained, by operating in the absence of a catalyst, with various feed gas compositions and at temperatures ranging from about 1700° to about 2500° F. In Runs 1 and 2 an initial feed consisting of 85 percent hydrogen sulfide and 15 percent carbon dioxide is employed, while in Run 3 the ratio of hydrogen sulfide to carbon dioxide is substantially lower. To these feeds methane is added in an amount to give the carbon-hydrogen ratios indicated.

TABLE I

| Component of Reactor Tail Gas | Run 1,[1] 1,700° F. S/H Ratio=0.327 O/H Ratio=0.115 C/H Ratio=0.144 | Run 2,[1] 2,420° F. S/H Ratio=0.276 O/H Ratio=0.097 C/H Ratio=0.16 | Run 3,[1] 2,420° F. S/H Ratio=0.256 O/H Ratio=0.122 C/H Ratio=0.183 |
|---|---|---|---|
|  | Mol percent | Mol percent | Mol percent |
| CO | 18.0 | 13.8 | 17.0 |
| H₂ | 34.5 | 57.3 | 56.0 |
| H₂O | 0.2 |  |  |
| CO₂ | 0.1 |  |  |
| S₂ | 0.3 | 1.5 | 1.4 |
| COS | 1.1 | 0.2 | 0.2 |
| CH₄ | 0.1 | 0.2 |  |
| CS₂ | 2.7 | 11.0 | 9.4 |
| H₂S | 43.0 | 16.0 | 16.0 |

[1] Atmospheric pressure.

Because of the relatively low carbon-hydrogen ratio of the feed mixtures prior to methane addition, operation at the carbon deposition point cannot be effected. By increasing the methane-carbon dioxide ratio to a value of at least greater than 1, operation is permitted at the carbon deposition point because of the increased carbon-hydrogen ratio. Although a methane-carbon dioxide molar ratio of 1 is the lowest possible value which will permit operation at the carbon deposition point for temperatures near 1700° F., higher ratios are required as temperature is increased. In Run 3 the hydrogen sulfide-carbon dioxide ratio is less than that used in Runs 1 and 2. The effect of this condition is reflected in the decreased carbon disulfide conversions secured, i. e., 9.4 percent as compared to 11.0 percent. Run 1 illustrates the effect of a reduction in temperature on carbon disulfide conversions. It will be noted that although the sulfur-hydrogen ratio in Run 1 is greater than that employed in Run 2, the decrease in temperature of approximately 700° F. brings about a very substantial reduction in carbon disulfide conversion. Accordingly, about 1700° F., under such conditions, represents the minimum temperature level at which the reaction should be effected.

In the case of a sour natural gas having an excess of methane over that required to maintain the composition of the system in proper balance, oxygen in the form of air or carbon dioxide may be added. For example, a natural gas of the type contemplated—after removal of higher hydrocarbons—has the following composition:

9.8% CO₂
53.0% CH₄
37.2% H₂S

In order to determine the quantity of free oxygen or additional carbon dioxide that should be supplied to the feed to prevent carbon deposition, reference may be had to the graph in Figure 1. Curves A, B, C and D represent the various feed compositions required, at temperatures ranging from about 1700° to about 2420° F., to maintain the resulting system at the carbon deposition point. Specifically, Curve A shows the composition of a feed consisting of hydrogen sulfide, methane and oxygen required to operate at the carbon deposition point at a temperature of about 2400° F. Curve C gives the same information for a system containing carbon dioxide, instead of free oxygen. For feeds consisting of a mixture of carbon dioxide and free oxygen, the composition defining the point of imminent carbon deposition lies within the boundaries defined by Curves A and C and can be readily ascertained. If oxygen needs to be supplied to the system by the addition of carbon dioxide (because methane is in excess), the quantity of carbon dioxide required may be determined by drawing a line from the one-hundred percent carbon dioxide point to the point on the graph representing the respective concentrations of hydrogen sulfide and methane. The point at which the resulting line intersects Curve C indicates the amount of carbon dioxide that should be present to operate at the carbon deposition point with the specific feed under consideration. The quantity of free oxygen needed is only one-half of the required amount of carbon dioxide because the latter introduces carbon into the system, as well as oxygen, and since there is too much carbon present initially, more oxygen in the form of carbon dioxide is needed than is necessary when free oxygen is added. Yields of carbon disulfide are slightly better with free oxygen than with carbon dioxide since the oxygen-hydrogen ratio is not as high. Curves B and D, based on data obtained at 1700° F., give the same type of information as discussed above. In addition, the quantity of methane required by the system can be readily ascertained from Figure 1.

Figure 2:
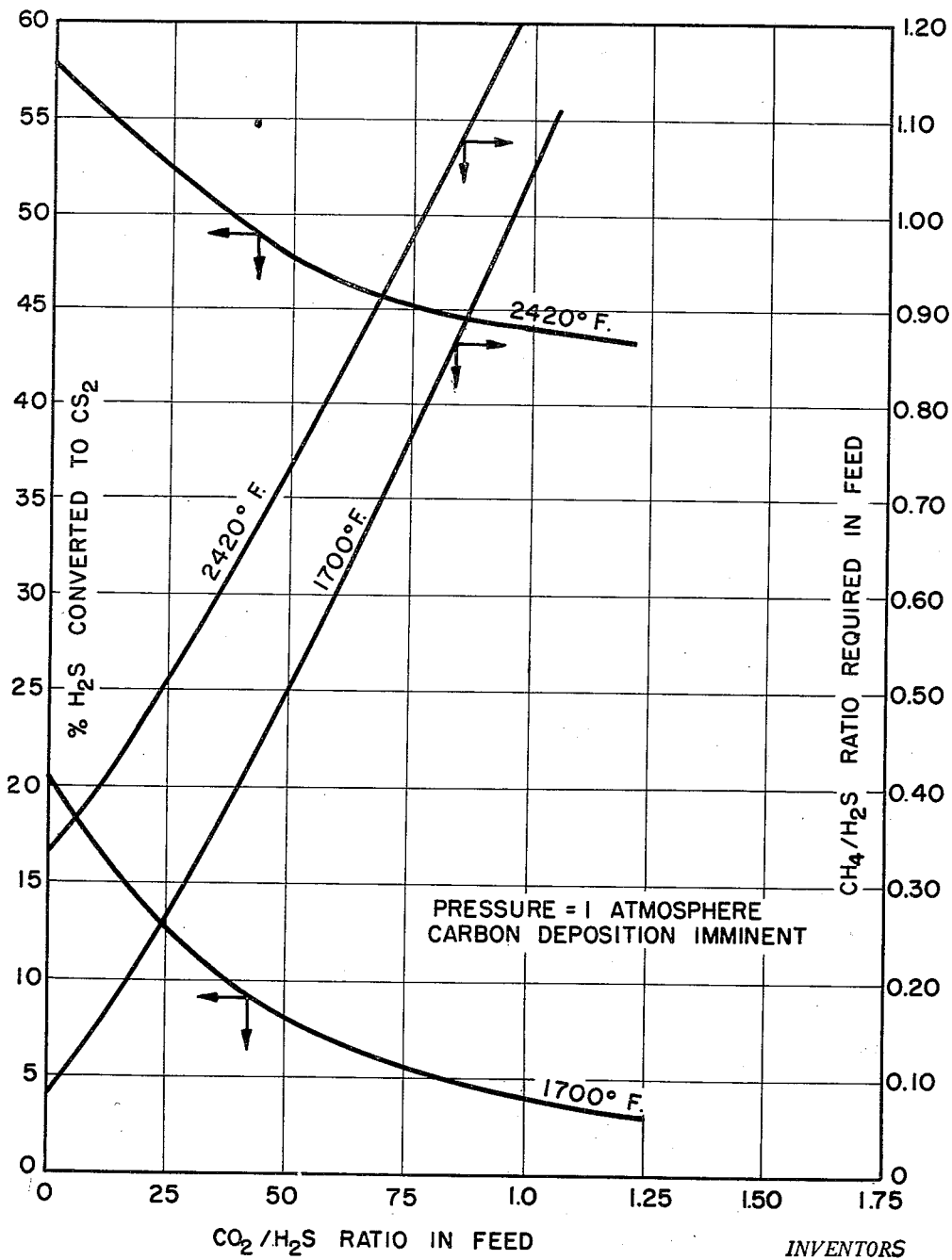

The graph in Figure 2 also illustrates the various feed compositions required at temperatures of 1700° and 2420° F., and the influence of temperature and composition on conversion of hydrogen sulfide to carbon disulfide. In all cases the curves in Figure 2 represent the composition of the feed required to operate at the carbon deposition point at the temperature indicated.

The table below shows conditions suitable for use with feeds in which an excess of methane is present and the results obtained when operating under such conditions in the absence of a catalyst.

TABLE II

| Component | Fresh Feed | | Reactor Tail Gas Composition [1] | Reaction Conditions |
|---|---|---|---|---|
| | Original Feed | After $O_2$ Added [1] | | |
| | Mol percent | Mol percent | Mol percent | |
| $CO_2$ | 9.8 | 8.3 | | Temp. 2,420° F. |
| $H_2S$ | 37.2 | 31.7 | 8.3 | Pressure, 1 Atmosphere. |
| $CH_4$ | 53.4 | 45.2 | | |
| $O_2$ | | 14.8 | | |
| $CO$ | | | 26.5 | S/H Ratio=0.13. |
| $S_2$ | | | 0.7 | |
| $COS$ | | | 0.2 | O/H Ratio=0.20. |
| $CS_2$ | | | 4.3 | |
| $H_2$ | | | 60.0 | C/H Ratio=0.22. |

[1] Nitrogen free basis.

Because of the comparatively high carbon monoxide and hydrogen content of the product gas, these components—after removal of the carbon disulfide—may be recycled to supply the necessary fuel for effecting the reaction. Under certain circumstances it may be economically justified to separate hydrogen sulfide from the product gases and, accordingly, that component——together with carbon monoxide and hydrogen—may be employed as the fuel source.

The process of our invention will be further illustrated by reference to the accompanying drawing (Figure 3) in which a cold (60° F.) feed mixture containing hydrogen sulfide, carbon dioxide and methane, wherein the ratio of carbon dioxide to hydrogen sulfide is about 0.18 and the ratio of methane to hydrogen sulfide is about 0.41, is introduced into heat exchanger 2 through line 4 where the temperature of the feed is increased to about 1000° F. by indirect heat exchange with hot gaseous reaction products in line 6. The feed is withdrawn through line 8 and sent to preheater 10, where it is brought to a reaction temperature of about 2400° F. and thereafter sent through line 12 to reactor 14, lined with a suitable refractory material 16. Conversion of the reactants to carbon disulfide occurs principally in reaction zone 18, which may or may not contain a bed of suitable catalyst. The resulting gaseous products of the reaction are taken overhead through line 6 and cooled by introduction thereof into heat exchanger 4, thus serving to preheat the cool feed in line 2. The gaseous stream from exchanger 2, which is now reduced in temperature to about 1400° F., is passed through line 20 to condenser 22 where the components of said stream are cooled further to a temperature of about 400° F., resulting in the separation of liquid sulfur, which is removed through line 24 and combined with the hot feed in line 8 for conversion to carbon disulfide. The uncondensed gases from condenser 22 are taken off through line 26 and sent to compresser 28, which is operated at a pressure of 300 p. s. i. The resulting compressed gases are withdrawn through line 30 and transferred to cooler 32, where they are cooled to 32° F. to separate carbon disulfide therefrom in liquid form through line 34. The carbon disulfide removed from the system at this point corresponds to about 93 percent of that present in the product gases. The gases leaving cooler 32, which consist chiefly of hydrogen sulfide, carbon monoxide and hydrogen, are next sent through line 36 to absorber 38, equipped to separate hydrogen sulfide from non-acidic gases. The method used to accomplish this object may be any of a number of well-established procedures. In general, we have found that a hydrogen sulfide separation system involving absorption of the hydrogen sulfide from the gaseous effluent by the use of a 15 to 25 weight percent aqueous diethanolamine solution, followed by liberation of hydrogen sulfide from the resulting diethanolamine salt, constitutes an adequate hydrogen sulfide separation method for the purposes of our invention. The gas from which the hydrogen sulfide has been stripped, and which consists chiefly of carbon monoxide and hydrogen, is removed from the absorber through line 40 and returned as fuel to preheater 10 and reactor 14 via line 42. The solution of diethanolamine, which is saturated with hydrogen sulfide, leaves absorber 38 through line 44 and is introduced into regenerator 46, from which hydrogen sulfide is liberated and withdrawn through line 48, serving to return the hydrogen sulfide thus regenerated to feed line 4. The resulting lean diethanolamine solution is withdrawn from the regenerator through line 50 and returned to absorber 38, where it is again used to separate hydrogen sulfide contained in the gases supplied by line 36. Make-up amine solution may be added to the system through line 52. If desired, the hydrogen sulfide recovered from the product gases by means of the aforementioned absorption system need not be returned to the reactor for further conversion to carbon disulfide, but may be utilized as feed to a suitable sulfur recovery plant capable of converting hydrogen sulfide to free sulfur in a known manner.

From the foregoing description it will be apparent that the process of our invention is susceptible of numerous modifications without materially departing from the scope thereof. In general, it may be said that any procedure employing in principle the novel conditions set forth herein is intended to come within the spirit of our invention.

We claim:

1. In a process for the production of carbon disulfide from hydrogen sulfide-containing gases, the improvement which comprises injecting into a reaction zone at a temperature of from about 2000° to about 2450° F. a gaseous feed consisting essentially of hydrogen sulfide, carbon dioxide and methane wherein the atomic ratio of carbon to hydrogen ranges from about 0.1 to about 0.35, the oxygen-hydrogen atomic ratio ranges from a value greater than zero to about 0.35 and the sulfur-hydrogen atomic ratio ranges from about 0.15 to about 0.45.

2. The process of claim 1 in which free oxygen is present in the gaseous feed in addition to carbon dioxide.

3. The process of claim 1 in which free oxygen is employed in place of carbon dioxide.

4. The process of claim 1 in which the temperature employed ranges from about 1700° to about 2500° F.

5. In a process for the production of carbon disulfide from hydrogen sulfide-containing gases, the improvement which comprises adjusting the proportions of reactants in a gaseous mixture containing essentially hydrogen sulfide and carbon dioxide by the addition of a normally-gaseous hydrocarbon so that the atomic ratios of sulfur to hydrogen, carbon to hydrogen and oxygen to hydrogen range, respectively, from about 0.1 to about 0.35, from a value greater than zero to about 0.35 and from about 0.15 to about 0.45, and thereafter subjecting the resulting gaseous mixture to reaction at a temperature ranging from about 2000° to about 2450° F.

6. The process of claim 5 in which methane is the normally-gaseous hydrocarbon added to the gaseous mixture consisting essentially of hydrogen sulfide and carbon dioxide.

7. In a process for the production of carbon disulfide from gases containing hydrogen sulfide, the improvement which comprises injecting a gaseous feed containing hydrogen sulfide, methane and oxygen into a reaction zone at a temperature of from about 2000° to about 2450° F., wherein the ratio of sulfur to hydrogen ranges from about 0.15 to about 0.45, the ratio of carbon to hydrogen ranges from about 0.1 to about 0.35 and the ratio of oxygen to hydrogen ranges from a value greater than zero to about 0.35, to produce a hot gaseous mixture comprising carbon disulfide, free sulfur, carbon monoxide and hydrogen, passing said hot gaseous mixture in indirect heat exchange relationship with an additional portion of said gaseous feed, thereafter removing carbon disulfide from said mixture, subsequently separating carbon monoxide and hydrogen from the resulting carbon disulfide-depleted gaseous mixture and employing at least a portion of the separated carbon monoxide and hydrogen as fuel to bring the temperatureture of the aforesaid reaction zone to the required level for the conversion of said gaseous feed.

8. The process of claim 7 in which the oxygen present in said gaseous feed is derived from carbon dioxide.

9. In a process for the production of carbon disulfide from gases containing hydrogen sulfide which comprises injection of a gaseous feed consisting of hydrogen sulfide, methane and free oxygen into a reaction zone at a temperature of from about 2000° to about 2450° F., wherein the ratio of sulfur to hydrogen ranges from about 0.15 to about 0.45, the ratio of carbon to hydrogen ranges from about 0.1 to about 0.35 and the ratio of oxygen to hydrogen ranges from a value greater than zero to about 0.35, to produce a hot gaseous mixture comprising carbon disulfide, free sulfur, carbon monoxide and hydrogen, passing said hot gaseous mixture in indirect heat exchange relationship with an additional portion of said gaseous feed, thereafter removing carbon disulfide from said mixture, subsequently separating carbon monoxide and hydrogen from the resulting carbon disulfide-depleted gaseous mixture and employing at least a portion of the separated carbon monoxide and hydrogen as fuel to bring the temperature of the aforesaid reaction zone to the required level for the conversion of said gaseous feed.

References Cited in the file of this patent

UNITED STATES PATENTS

| 1,735,409 | Pier et al. | Nov. 12, 1929 |
| 2,052,297 | Iddings | Aug. 25, 1936 |
| 2,141,768 | Silsby | Dec. 27, 1938 |
| 2,556,176 | Gamson | June 12, 1951 |

FOREIGN PATENTS

| 293,172 | Great Britain | July 5, 1928 |
| 331,734 | Great Britain | July 10, 1930 |